US006432863B2

(12) United States Patent
Ward

(10) Patent No.: US 6,432,863 B2
(45) Date of Patent: *Aug. 13, 2002

(54) HALOGENATED SUPPORTS AND SUPPORTED ACTIVATORS

(75) Inventor: David George Ward, Laurel, MD (US)

(73) Assignee: W. R. Grace & Co.-Conn., Columbia, MD (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/209,115

(22) Filed: Dec. 10, 1998

Related U.S. Application Data

(62) Division of application No. 08/476,188, filed on Jun. 7, 1995, now Pat. No. 5,885,924.

(51) Int. Cl.[7] .............................................. B01J 31/00
(52) U.S. Cl. ........................ 502/152; 502/155; 502/156
(58) Field of Search ............................... 502/152, 155, 502/156

(56) References Cited

U.S. PATENT DOCUMENTS

| | | | |
|---|---|---|---|
| 2,611,778 A | 9/1952 | Speier, Jr. ................... 556/486 |
| 2,944,914 A | 7/1960 | Bugosh ....................... 502/439 |
| 3,546,267 A | 12/1970 | Ismail ......................... 556/486 |
| 3,576,034 A | 4/1971 | Pearce ........................ 556/486 |
| 3,576,833 A | 4/1971 | Hammann et al. .......... 556/486 |
| 3,641,087 A | 2/1972 | Holman ...................... 556/486 |
| 3,803,199 A | 4/1974 | Voss et al. .................. 556/486 |
| 3,887,494 A | 6/1975 | Dietz .......................... 252/452 |
| 3,888,789 A | 6/1975 | Dombro et al. ............. 252/429 |
| 4,077,904 A | 3/1978 | Noshay et al. .............. 252/429 |
| 4,133,823 A | 1/1979 | Joyce, III et al. ........... 556/400 |
| 4,321,184 A | 3/1982 | Blount ........................ 556/400 |
| 4,359,403 A | 11/1982 | Hoff et al. .................. 252/429 |
| 4,520,122 A | 5/1985 | Arena ......................... 502/152 |
| 4,565,796 A | * 1/1986 | Etherton ...................... 502/125 |
| 4,565,797 A | * 1/1986 | Etherton et al. ............. 502/125 |
| 4,618,596 A | * 10/1986 | Agapiou et al. ............. 502/125 |
| 4,634,747 A | * 1/1987 | Best ............................ 526/124 |
| 4,849,390 A | 7/1989 | Sano et al. .................. 502/113 |
| 4,894,468 A | 1/1990 | Wilchek et al. ............. 556/400 |
| 4,983,566 A | 1/1991 | Wieserman et al. ........ 502/415 |
| 5,182,016 A | 1/1993 | Funkenbusch et al. ...... 502/402 |
| 5,268,097 A | 12/1993 | Girot et al. .................. 502/402 |
| 5,271,833 A | 12/1993 | Funkenbusch et al. ...... 502/402 |
| 5,274,159 A | 12/1993 | Pellerite et al. ............. 556/400 |
| 5,322,557 A | 6/1994 | Inomata et al. ............. 556/400 |
| 5,407,884 A | 4/1995 | Turner et al. ................ 502/155 |
| 5,408,017 A | 4/1995 | Turner et al. ................ 526/134 |
| 5,455,214 A | * 10/1995 | Furtek et al. ................ 502/152 |
| 5,466,766 A | * 11/1995 | Patsidis et al. .............. 502/152 |
| 5,473,020 A | 12/1995 | Peifer et al. ................. 525/243 |
| 5,576,453 A | 11/1996 | Buese ......................... 556/400 |
| 5,643,847 A | * 7/1997 | Walzer, Jr. .................. 502/152 |
| 5,807,938 A | * 9/1998 | Kaneko et al. .............. 502/152 |
| 5,824,620 A | * 10/1998 | Vega et al. .................. 502/152 |
| 5,834,393 A | * 11/1998 | Jacobsen et al. ............ 502/152 |
| 5,846,895 A | * 12/1998 | Gila et al. ................... 502/107 |
| 5,885,924 A | * 3/1999 | Ward .......................... 502/402 |
| 5,932,511 A | * 8/1999 | Harmer et al. .............. 502/155 |
| 5,939,347 A | * 8/1999 | Ward et al. .................. 502/153 |
| 5,972,823 A | * 10/1999 | Walzer, Jr. .................. 502/128 |
| 6,005,148 A | * 12/1999 | Tanielyan et al. ........... 502/154 |
| 6,025,295 A | * 2/2000 | Tanielyan et al. ........... 502/155 |
| 6,028,149 A | * 2/2000 | Luciani et al. .............. 502/115 |
| 6,034,026 A | * 3/2000 | Garoff et al. ................ 502/154 |
| 6,040,261 A | * 3/2000 | Hlatky ........................ 502/117 |
| 6,087,293 A | * 7/2000 | Carnahan et al. ........... 502/152 |
| 6,100,214 A | * 8/2000 | Walzer, Jr. et al. .......... 502/155 |
| 6,184,171 B1 | * 2/2001 | Shih ............................ 502/158 |

FOREIGN PATENT DOCUMENTS

| | | | |
|---|---|---|---|
| CA | 527333 | 7/1956 | ................. 556/486 |
| DE | 60 305 | 11/1968 | ................. 556/486 |
| EP | 0594914 | 5/1994 | |
| EP | 0628574 | 12/1994 | |
| FR | 1503372 | 11/1967 | ................. 556/486 |
| GB | 685539 | 1/1953 | ................. 556/486 |
| GB | 1170930 | 11/1969 | ................. 556/486 |
| GB | 1 211 205 | 11/1970 | ................. 556/486 |
| GB | 2 108 139 | 5/1983 | ................. 556/486 |
| JP | 60-1190 | 1/1985 | ................. 556/486 |
| RU | 226474 | 2/1969 | ................. 556/486 |
| WO | 93/11172 | 6/1993 | |
| WO | 94/03506 | 2/1994 | |
| WO | 95/07140 | 3/1995 | |

OTHER PUBLICATIONS

G. E. Zaitseva et al., Zh. Fiz. Khim., vol. 47, No. 6, pp. 1531–1534 (Chem. Abstracts No. 79:108383).

P.D. George et al., J. Org. Chem., vol. 25, pp. 1645–1648 (Sep. 1960).

Highly Isospecific, Immobilized Zirconocene Catalysts Supported on Chemically Modified SiO2, Kazuo Soga, Japan Advanced Institute of Science and Technology, Hokuriku 15 Asahidai, Tatsunokuchi, Ishikawa Pref., Ishikawa Pref., Japan, Macromol. Symp. vol. 89, pp. 249–258, Jan. 1995.

Jia, L. et al., "Cationic do/fo Metallocene Catalysts, Properties of Binuclear Organoborane Lewis Acid Cocatalysts and Weakly Coordinating Counteranionis Derived Therefrom," Organometallics, 1994, 13, 3755–3757.

(List continued on next page.)

*Primary Examiner*—Mark L. Bell
*Assistant Examiner*—J. Pasterczyk
(74) *Attorney, Agent, or Firm*—Beverly J. Artale

(57) ABSTRACT

The present invention is directed to a supported catalytic activator composition resulting from the contact of a catalyst support (formed by reaction of a carrier, such as an inorganic oxide (e.g., silica) and an organo halide such as bromo pentafluorobenzene in the presence of base) and a catalytic activator such as dimethylanilinium tetrakis (pentafluorophenyl) borate, and methods for making the same.

14 Claims, No Drawings

OTHER PUBLICATIONS

Horton, A. D., et al., "Lewis–Base Free Cationic Zirconocene Complexes Containing an Alkenyl Ligand," Organometallics, 1991, 10, 3910–3918.

Yang, X., et al., "Cationic Zirconocene Olefin Polymerization Catalysts Based on the Organo–Lewis Acid Tri(pentafluoropheny)borane. A Synthetic, Structural, Solution Dynamic, and Polymerization Catalysts Study," Dept. of Chem., Northwestern Univ. J. Am. Chem. Soc. 1994, vol. 116, pp. 10015–10031.

Bahr, S. R. et al., "Trityl Tetrakis (3,5–bis(trifluoromethyl)phenyl)–borate: A New Hydride Abstraction Reagent," Dept. of Chem., North Dakota State Univ. J. Org. Chem., 1992, vol. 57, pp. 5545–5547.

Lin, Z., et al., "Models for Organometallic Molecule–Support Complexes Synthesis and Properties of Cationic Organoactinides," J. Am. Chem. Soc. 1987, 109, 4127–4129.

Hlatky, G. G., et al., "Ionic Base Free Zirconocene Catalysts for Ethylene Polymerization," J. Am. Chem. Soc., 1989, 111, 2728–2729.

Yang, X., "Cationic Metallocene Polymerization Catalysts, Synthesis and Properties of the First Base–Free Zirconocene Hydride," Angew. Chem. Int. Ed. Engl. 1992, 31, No. 10., pp. 1375–1377.

T. J. Marks et al. Organometallics 1995, vol. 14, No. 7 pp. 3135–3137.

* cited by examiner

HALOGENATED SUPPORTS AND SUPPORTED ACTIVATORS

This is a division of application Ser. No. 08/476,188, filed Jun. 7, 1995 now U.S. Pat. No. 5,885,924.

BACKGROUND OF THE INVENTION

Transition metal catalysts, i.e., Ziegler-Natta and metallocenes, generally cannot be practically used for gas or slurry phase polymerization unless sufficiently supported. The use of supported catalysts offers the possibility of gas and slurry phase compatibility. Control of the particle size distribution of the polymeric product in the various polymerization processes eliminates or reduces the extent of reactor fouling.

Supported catalysts for olefin polymerization are well known in the art. These catalysts offer, among other things, the advantages of being useable in gas or slurry phase reactors, allowing the control of polymer particle size and thereby the control of the product bulk density. Gas phase reactors also eliminate the need for a solvent and the equipment for solvent handling during separation of the solvent from the resin. However, it is known that transition metal catalysts, particularly metallocene catalysts, are deactivated by supports that contain reactive functionalities, such as silicas which are oxide supports.

Accordingly, when using supported polyolefin catalysts, it is often desired to remove or reduce hydroxyl groups and other reactive functionalities from the support particles before and/or during manufacture of the supported catalyst. Removal of the reactive functionalities is often desirable since they will often react with the catalyst thereby deactivating it.

For example, in the past, various thermal and/or chemical treatments have been used in an effort to achieve dehydroxylation of the oxide particles.

Thermal treatments (i.e., calcining) are advantageous from the point that they do not add undesirable chemicals to the support and that they are relatively simple inexpensive processes. Unfortunately, thermal treatments are often ineffective for achieving a high degree of dehydroxylation. Further, for many porous oxide supports (e.g., silica gel), thermal treatments often result in an undesirable loss of pore volume, shrinkage of the pores and/or loss of surface area.

Furthermore, a variety of chemical treatments have been attempted to remove or deactivate reactive functionalities. Many types of chemicals have been used such as organo aluminum compounds, magnesium chloride/dehydrating agent combinations, organosilanes, halosilanes, silanes, etc. These various chemical processes are often expensive and may result in the addition of undesired or complicating constituents to an oxide support.

Thus, there remains a need for improved catalytic supports and supported activators having the undesired reactive functionalities deactivated.

Moreover, it is sometimes desirable to impart different characteristics to the support surface. The attachment of selected organic moieties to the support effects the characteristics of the support and hence the catalytic nature of the catalyst and/or activator placed on the support.

Thus it is an object of this invention to provide a method to deactivate reactive functionalities on catalytic supports as well to provide for a new support for transition metal catalysts and a supported catalytic activator.

Furthermore, it is an object of the present invention to provide a supported activator and a supported transition metal catalyst and/or catalyst system (support, activator and catalytic precursor) capable of not only producing polymers, but also providing a catalyst with hydrogen sensitivity so as to allow use of hydrogen to control molecular weight in olefin polymerization reactors.

SUMMARY OF THE INVENTION

The invention provides supports, supported catalytic activators and supported catalytic systems, wherein the supports have unique surface chemical compositions. The present invention further includes methods for making and using such compositions.

In particular, the present invention uses halogenated organic moieties that are covalently bonded to the support surface. Reactive functionalities on typical catalyst supports, such as hydroxyl groups, known as catalyst poisons, are consumed and the halogenated, most preferably fluorinated, organics are bonded to the support in their stead. These halogenated organic supports are ideal for supporting transition metal catalysts, particularly metallocene and/or Ziegler-Natta catalysts, particularly when a borate and/or aluminate catalyst activator is used. The support and supported catalytic activator of the present invention imparts enhanced properties, including improved activity and reduced reactor fouling while obtaining a resin particle of good morphology, bulk density, and enhanced comononer incorporation.

In one aspect, the present invention is a support composition represented by the following formula.

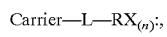

Carrier—L—$RX_{(n)}$;

wherein the Carrier is not particularly limited and includes any material capable of forming a covalent bond with the halogenated organic group RX(n) and includes inorganic carriers, inorganic oxide carriers and organic carriers. Of these, inorganic carriers and inorganic oxide carriers are particularly preferred.

$RX_{(n)}X'$ is any halogenated organic compound, wherein X and X' are independently halogen groups and typically are fluorine, chlorine, iodine, and bromine and mixtures thereof; and n is a number from 1 to 9.

L represents the linkage resulting from the reaction of the support reactive functionality with a base (described below) that would be present on the support and capable of forming a covalent bond with the halogenated organic group $RX_n$.

In another aspect of the invention, the invention provides a supported catalytic activator for use with transition metal catalytic precursor represented by the below formula.

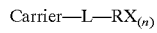

Carrier—L—$RX_{(n)}$     [Compound A]

Where the Carrier, L, and $RX_{(n)}$ are as described above and Compound A is a compound capable of forming an ionic complex when reacted with a transition metal catalytic precursor and is further represented by the formulas $[Ct]^+$ $[M''(Q_1-Q_{n+1})]^-$ and $M''Q_n$.

$[Ct]^+$ is an activating cation, which may be a Bronsted acid capable of donating a proton to the transition metal catalytic precursor resulting in a transition metal cation; or $[Ct]^+$ may be an abstracting moiety that is capable of reacting with a transition metal catalytic precursor resulting in the transition metal cation.

$[M''(Q_1-Q_{n+1})]^-$ is a compatible, large (bulky), non-coordinating anion capable of stabilizing the active transition metal catalytic species which is formed when the transition metal catalyst precursor is combined with the supported activator of present invention. These anionic coordination complexes comprise a plurality of lipophilic radicals covalently coordinated to and shielding a central charge-bearing metal or metalloid.

$M^n(Q_n)$ is a large (bulky), non-coordinating, neutral species that is capable of stabilizing the active transition metal catalytic species which is formed when the transition metal catalyst precursor is combined with the supported activator of present invention. These anionic coordination complexes comprise a plurality of lipophilic radicals covalently coordinated to and shielding a central charge-bearing metal or metalloid.

In a third embodiment of the present invention, the support or the supported activator is combined (in any order of addition) with a transition metal catalytic precursor to provide a supported catalyst or a supported catalytic system. The support or the supported activator of the present invention may be combined with the transition metal catalytic precursor either prior to or during introduction to the polymerization reactor zone. Upon contact with the activator, the transition metal precursor reacts to form the active catalytic species.

The invention further includes the method for producing halogenated supports, supported catalytic activators, and catalyst systems as well, and methods for using the halogenated support in transition metal catalyst systems to polymerize olefins, diolefins, cyclic olefins and acetylenically unsaturated monomers to produce polymers, particularly polyethylene.

These and other aspects of the invention will be described in further detail below.

DETAILED DESCRIPTION OF THE INVENTION

The invention broadly encompasses support particles characterized by the present of halogenated organic groups on the particle surface represented by the formula Carrier- L-$RX_{(n)}$::; and further a supported catalytic activator represented by the formula Carrier- L -$RX_{(n)}$:: [Compound A] and supported catalyst systems by placing transition metal catalysts on the support of the present invention or the supported catalytic activator of the present invention. For purposes of this invention the symbol . . . is intended to represent a weak coordinative bond between the $RX_n$ groups and Compound A as disclosed in *Organometallics,* 1995, Vol. 14, pages 3135 to 3137; and *Angew Chem. Int. Ed. Engl.,* 1992, Vol. 31, No. 10, pages 1375 to 1377.

The components of the present invention are described below.

The Carrier

The carrier particles of the invention may be virtually any material having a reactive functionality and capable of forming a covalent bond to the halogenated organic compound $RX_{(n)}X'$.

The carrier suitable for the present invention includes inorganic carriers, inorganic oxide carriers, and organic carriers. Of these, inorganic carriers and inorganic oxide carriers are particularly preferably. More specifically, the inorganic carriers include magnesium compounds or their complex salts such as MgC12, MgCl(OEt) and Mg(OEt)$_2$, and organic magnesium compounds such as those represent by $MgR^2_aX^2_b$. As used herein, $R^2$ is an alkyl group having 1 to 20 carbon atoms, an alkoxy group having 1 to 20 carbon atoms or an aryl group having 6 to 20 carbon atoms; $X^2$ is a halogen atom; a is a number from 0 to 2 and b is a number from 0 to 2.

Inorganic oxide carriers include talcs, clays, $SiO_2$, $Al_2O_3$, MgO, $ZrO_2$, $TiO_2$, $Fe_2O_3$, $B_2O_3$, CaO, ZnO, BaO, $ThO_2$ and mixtures thereof such as silica alumina, silica alumina titania, zeolite, ferrite and glass fibers. In addition, the above-mentioned inorganic oxide carriers may contain a small amount of carbonates, nitrates, sulfides or the like.

Additional carrier materials include aluminum phosphate gel materials as well as polymeric or organic supports containing reactive functionalities such as polyvinylcholoride, polyvinylalcohol, poly (methylmethacrylate) and hydroxy substituted polystyrene and mixtures of two or more of the foregoing.

Preferred carrier materials are silica or alumina based materials such as silica, and oxides of Si—Al, Si—Ti, Si—Al—Ti, $SiMgCl_2$, and aluminum phosphate gel materials and mixtures thereof; and most preferred materials are silica, silica-alumina, silica-alumina-titania and $SiMgCl_2$ materials and mixtures thereof.

The carriers suitable for this invention can be, but need not be calcined before use.

Preferably, the carriers are compositions conventionally used as a catalyst support material. The degree of porosity in the carrier may be any level that is achievable in the starting material. Preferably, the carrier particles of the present invention have a pore volume of at least 0.3 cc/g; preferably from 0.3 to 5 cc/g; more preferably from 0.3 to 3 cc/g; and most preferably, the pore volume exceeds 1 cc/g. Preferably, the carrier particles have a surface area of about 1–1000 m$^2$/g; preferably from 200–800 m$^2$/g; and most preferably from 250 to 650 m$^2$/g. The typical median particle size for a suitable carrier for this invention is from 1 to 300 microns, preferably from 10 to 200 microns, more preferably from 20 to 100 microns.

Pore volume and surface area can be, for example, measured from volume of nitrogen gas adsorbed in accordance with BET method. (Refer to J. Am. Chem. Soc., vol. 60, p. 309 (1938)).

The Linker

L represents the linkage resulting from the reaction of the support reactive functionality with a base (described below) and is preferably selected from the group comprising oxygen, carbon, sulfur, nitrogen, boron and mixtures thereof, that would be present on the support and capable of forming a covalent bond to the halogenated organic compound $RX_{(n)}X'$.

The Halogenated Organic

The halogenated organic groups on the support particle surface are believed to be substituted for at least some of the reactive functionality groups on the surface of the carrier particles. The net effect of the substitution is to form a linkage (L) between the support and the halogenated organic group ($RX_{(n)}$) where L and $RX_{(n)}$ is as herein defined. The total amount of $RX_{(n)}$ groups on the support surface is dependent on the number of reactive groups present on the carrier to be treated. The amount of $RX_{(n)}$ groups is typically about 10 mmol per gram of support (mmole/g) or less (but greater than zero), preferably, from 0.1 to 5 mmole/g; and most preferably, from 1.0 to 3.0 mmole/g.

$RX_{(n)}$ is any halogenated organic group where X is a halogen group element and is typically fluorine, chlorine, and bromine and mixtures thereof; preferred is fluorine; n is a number from 1 to 9; and R is mono or multi-cyclic aryls, alkyls, and alkenyl groups and mixtures thereof; preferred are $C_{1-20}$ alkenyl groups (such as ethene, propylene, butene, and pentene); $C_{1-20}$ alkyl groups (such as methyl, ethyl, n-proply, iso-propyl, n-butyl, n-octyl, and 2-ethylhexyl groups), $C_{6-20}$ aryl group (including substituted aryls) (such as phenyl, p-tolyl,benzyl, 4-t-butylphenyl, 2,6 dimethylphenyl, 3,5-methylphenyl, 2,4-dimethylphenyl, 2,3-dimethylphenyl groups) and mixtures thereof. More preferred R groups are $C_{1-5}$ alkyls, $C_{2-5}$ alkenyls, phenyl and napthyl and mixtures thereof.

Preferred $RX_{(n)}$ groups are $C_{1-20}$ halogenated hydrocarbon groups such as $XCH_2$, $X_2CH$, $X_3C$, $C_2X_nH_{n-5}$ (where n=1-5), $C_3H_nX_{n-7}$ (n=1-7) and $C_6X_nX_{n-6}$ (n=1-6) and mixtures thereof; most preferably, $FCH_2$, $CHF_2$, $F_3C$, and fluorosubstituted phenyl, wherein the phenyl can be mono to pentasubstituted (such as p-fluorophenyl, 3-5-diflourophenyl, pentafluorophenyl, 3,4,5-trifluorophenyl, and 3,5-bis(trifluoromehyl) phenyl groups) and mixtures thereof; of these the most preferred is pentafluorophenyl.

Compound A

Compound A is a compound capable of forming an ionic complex when reacted with a transition metal catalytic precursor and is further represented by the formulae:

$$[Ct]^+[M^n(Q_1-Q_{n+1})]^-$$

and $$M^n(Q_n).$$

$[Ct]^+$ is an activating cation, which may be a Bronsted acid capable of donating a proton to the transition metal ionic catalytic precursor resulting in a transition metal cation. Such Bronsted acids include but are not limited to ammoniums, oxoniums, phosphoniums and mixtures thereof; preferably ammoniums of methylamine, aniline, dimethylamine, diethylamine, N-methylaniline, diphenylamine, trimethylamine, triethylamine, N-N-dimethylaniline, methyldiphenylamine, pyridine, p-bromo-N,N,-dimethylaniline, p-nitro-N,N-dimethylaniline; phosphoniums from triethylphosphine, triphenylphosphine and diphenylphosphine; oxoniums from ethers such as diethyl ether, tetrahydrofuran and dioxane; sulfoniums from thioethers such as diethyl thioethers and tetrahydrothiophene; mixtures thereof; most preferably dimethylanilinium.

Furthermore, $[Ct]^+$ may be an abstracting moiety that is capable of reacting with a transition metal catalytic precursor resulting in the transition metal cation. Acceptable abstracting moiety include but are not limited to silver, carbocations, tropylium, carbeniums, ferroceniums and mixtures thereof, preferably cabonimus and ferroceniums and mixtures thereof; and most preferably triphenyl carbenium. The $[Ct]^+$ may also including mixtures of the Bronsted acids and the abstracting moiety species.

[M] is selected from the group consisting of boron, phosphorus, antimony or aluminum and mixtures thereof, having the n valence state. Preferably, the [M] is born, aluminum and mixtures thereof.

$[Q_1-Q_{n+1}]$ are independent, wherein $Q_1-Q_{n+1}$ are $RX_{(n)}$ as is defined above and wherein each of the Q in the coordinating anion may be the same or different and may be the same or different from the $RX_{(n)}$ bonded to the support through the linker L defined above. Moreover, in this RX, the $Q_1$ to $Q_n$ may be hydride radicals, bridged or unbridged dialkylamido radicals, alkoxide and aryloxide radicals, substituted hydrocarbyl radicals, halocarbyl- and substituted-halocarbyl radicals and hydrocarbyl-substituted organometalloid radicals. Additionally, the $Q_1$ to $Q_n$ can simply be the X alone; for example as in $BX_4^-$.

In addition, neutral $M^n(Q_n)$, can be used in place of the $[Ct]^+[Mn(Q_1Q_{n+1})]^-$, for example $B(C_6F_5)_3$.

Preferred $[M^n(Q_1-Q_{n+1})]^-$ are selected from the group consisting of Bphenyl$_4^-$, $B(C_6H_2(CF_3)_3)_4^-$, $B(C_6H_5)_4^-$, AlPhenyl$_4^-$, $Al(C_6H_2(CF_3)_3)_4^-$, $Al(C_6H_5)_4^-$, $PF_6^-$, $BF_4^-$, $B(OPh)_4^-$ and mixtures thereof; preferably, $B(C_6F_5)_4^-$, $Al(C_6F_5)_4^-$, $Al(C_6H_2(CF_3)_3)_4^-$, $Al(C_6H_5)_4^-$, $BC^qH_2(CF_3)_3)_4^-$ and mixtures thereof; most preferred are $B(C_6F_5)_4^-$, $Al(C_6F_5)_4^-$ and mixtures thereof. Preferred $M^n(Q_n)$ from the neutral species of the preferred list above of $[M^n(Q_1-Q_{n+1})]^-$.

Transition Metal Catalytic Precursors

The transition metal catalytic precursors are typically Ziegler-Natta catalysts including metallocenes. The term metallocenes is defined as organometallic compounds having a transition metal, including rare earth metals, in coordination with members of at least one five-member carbon ring, heterosubstituted five-member carbon ring, or a bridged (ansa) ligand defined as multi cyclic moieties capable of coordinating to the transition or rare earth metals.

The ansa bridge can be selected from the group comprising carbon, silicon, phosphorus, sulfur, oxygen, nitrogen, germanium, species such as, $R^3{}_2C$, $R^3{}_2Si$, $R^3{}_2Ge$, $R^3{}_2CR^3{}_2C$, $R^3{}_2SiR^3{}_2Si$, $R^3{}_2GeR^3{}_2Ge$, $R^3{}_2CR^3{}_2Si$, $R^3{}_2CR^3{}_2Ge$, $R^3{}_2CR^3{}_2CR^3{}_2C$, $R^3{}_2SiR^3{}_2Si$ diradicals where $R^3$ is independently selected from the group containing hydride, halogen radicals, and C1-20 hydrocarbyl radicals and B1 the like. Preferably, the ansa bridge has a length of two atoms or less as in methylene, ethylene, diphenysilyl, dimethylsilyl, propylidene and methylphenylsilyl.

The transition metal component of the metallocene is selected from Groups 3 through 10, lanthanides and actinides of the Periodic Table and mixtures thereof; and most preferably, titanium, zirconium, hafnium, chromium, vanadium, samarium and neodymium and mixtures thereof. Of these Ti, Zr, and Hf and mixtures thereof are most preferable.

In one preferred embodiment, the metallocene catalyst precursor is represented by the general formula (CP)$_M$MR$^4{}_n$R$^5{}_p$, wherein Cp is a substituted or unsubstituted cyclopentadienyl ring, M is a Group 3–6, lanthanide, actinide series metal from the Periodic Table and mixtures thereof; $R^4$ and $R^5$ are independently selected halogen, hydrocarbyl group, or hydrocarboxyl groups having 1–20 carbon atoms; m=1–3, p=0–3 and the sum of m+n+p equals the oxidation state of M.

In another embodiment the metallocene catalyst is represented by the formulae:

$$(C_5R^6{}_m)_pR^7{}_s(C_5R^6{}_m)MZ_{3-p-x}$$

and $$R^7{}_s(C_5R^6{}_m)_2MZ'.$$

Wherein M is a Group 3–6, lanthanide, actinide series metal from the Periodic Table and mixtures thereof; $C_5R^6{}_m$ is a substituted cyclopentadienyl each $R^6$, which can be the same or different is hydrogen, alkenyl, aryl, or arylalkyl radical having from 1 to 20 carbon atoms or two carbon atoms joined together to form a part of a $C_4$ to $C_6$ ring; $R^7$ is one or more of or a combination of a carbon, a germanium, a silicon, a phosphorous or a nitrogen atom containing radical substitution on and bridging two $C_5R^6{}_m$ rings or bridging one $C_5R^6{}_m$ ring back to M, when p=0 and x=1 otherwise x is always equal to 0, each Z which can be the same or different is an aryl alkyl, alkenyl, alkaryl, or arylalkyl radical having from 1–20 carbon atoms or halogen, Z' is an alkylidene radical having from 1 to 20 carbon atoms, s is 0 to 1 and when s is 0, m is 5 and p is 0, 1, or 2 and when s is 1, m is 4 and p is 1.

In particular, preferred metallocenes are derivatives of a cyclopentadiene (Cp), including cyclopentadienyl, indenyl, fluorenyl, tetrahydroindenyl, and 1,1-disubstituted silacyclopentadienes, phosphocyclopentadienes, 1-metallocyclopenta-2,4-dienes, bis(indenyl)ethane and mixtures thereof.

Additional illustrative but non-limiting examples of metallocenes represented by the above definition are dialkyl metallocenes such as bis(cyclopentadienyl)titanium dimethyl, bis(cyclopentadienyl)titanium diphenyl, bis(cyclopentadienyl)zirconium dimethyl, bis(cyclopentadienyl)zirconium diphenyl, bis(cyclopentadienyl)hafnium dimethy 1 and diphenyl, bis(cyclopentadienyl)titanium di-neopentyl, bis(cyclopentadienyl)zirconium di neopentyl, bis(cyclopentadienyl)titanium dibenzyl, bis(cyclopentadienyl) zirconium dibenzyl, bis(cyclopentadienyl)vanadium dimethyl; the mono alkyl metallocenes such as bis(cyclopentadienyl)titanium methyl chloride, bis(cyclopentadienyl)titanium ethyl chloride, bis(cyclopentadienyl)titanium phenyl chloride, bis(cyclopentadienyl)zirconium methyl chloride, bis(cyclopentadienyl)zirconium ethyl chloride, bis(cyclopentadienyl)zirconium phenyl chloride, bis(cyclopentadienyl)titanium methyl bromide; the trialkyl metallocenes such as cyclopentadienyl titanium trimethyl, cyclopentadienyl zirconium triphenyl, and cyclopentadienyl zirconium trineopentyl, cyclopentadienyl zirconium trimethyl, cyclopentadienyl hafnium triphenyl, cyclopentadienyl hafnium trineopentyl, and cyclopentadienyl hafnium trimethyl; monocyclopentadienyls titanocenes such as, pentamethylcyclopentadienyl titanium trichloride, pentaethylcyclopentadienyl titanium trichloride; bis(pentamethylcyclopentadienyl) titanium diphenyl, the carbene represented by the formula bis(cyclopentadienyl)titanium=CH2 and derivatives of this reagent; substituted bis(cyclopentadienyl)titanium (IV) compounds such as: bis(indenyl)titanium diphenyl or dichloride, bis(methylcyclopentadienyl)titanium diphenyl or dihalides; dialkyl, trialkyl, tetra-alkyl and penta-alkyl cyclopentadienyl titanium compounds such as bis(1,2-dimethylcyclopentadienyl)titanium diphenyl or dichloride, bis(1,2-diethylcyclopentadienyl)titanium diphenyl or dichloride; silicon, phosphine, amine or carbon bridged cyclopentadiene complexes, such as dimethyl silyldicyclopen tadienyl titanium diphenyl or dichloride, methyl phosphine dicyclopentadienyl titanium diphenyl or dichloride, methylenedicyclopentadienyl titanium diphenyl or dichloride and other dihalide complexes, and the like; as well as bridged metallocene compounds such as isopropyl(cyclopentadienyl)(fluorenyl)zirconium dichloride, isopropyl(cyclopentadienyl)(octahydrofluorenyl)zirconium dichloride diphenylmethylene(cyclopentadienyl)(fluorenyl) zirconium dichloride, diisopropylmethylene (cyclopentadienyl)(fluorenyl)zirconium dichloride, diisobutylmethylene(cyclopentadienyl)(fluorenyl)zirconium dichloride, ditertbutylmethylene(cyclopentadienyl) (fluorenyl)zirconium dichloride, cyclohexylidene (cyclopentadienyl)(fluorenyl)zirconium dichloride, diisopropylmethylene (2,5-dimethylcyclopentadienyl)(fluorenyl) zirconium dichloride, isopropyl(cyclopentadienyl) (fluorenyl)hafnium dichloride, diphenylmethylene (cyclopentadienyl)(fluorenyl)hafnium dichloride, diisopropylmethylene(cyclopentadienyl)(fluorenyl)hafnium dichloride, diisobutylmethylene(cyclopentadienyl) (fluorenyl)hafnium dichloride, ditertbutylmethylene (cyclopentadienyl)(fluorenyl)hafnium dichloride, cyclohexylidene(cyclopentadienyl)(fluorenyl)hafnium dichloride, diisopropylmethylene(2,5-dimethylcyclopentadienyl)(fluorenyl)hafnium dichloride, isopropyl(cyclopentadienyl)(fluorenyl)titanium dichloride, diphenylmethylene(cyclopentadienyl)(fluorenyl)titanium dichloride, diisopropylmethylene(cyclopentadienyl) (fluorenyl)titanium dichloride, diisobutylmethylene (cyclopentadienyl)(fluorenyl)titanium dichloride, ditertbutylmethylene(cyclopentadienyl)(fluorenyl)titanium dichloride, cyclohexylidene(cyclopentadienyl)(fluorenyl) titanium dichloride, diisopropylmethylene(2,5 fluorenyl) titanium dichloride, racemic-ethylene bis(1-indenyl) zirconium(IV)dichloride, racemic-ethylene bis(4,5,6,7-tetrahydro-1-indenyl)zirconium(IV)dichloride, racemic-dimethylsilyl bis(1-indenyl) zirconium(IV)dichloride, racemic-dimethylsilyl bis(4,5,6,7-tetrahydro-1-indenyl) zirconium(IV)dichloride, racemic-1,1,2,2- tetramethylsilanylene bis(1-indenyl) zirconium(IV)dichloride, racemic-1,1,2,2-tetramethylsilanylene bis(4,5,6,7-tetrahydro-1-indenyl)zirconium(IV), dichloride, ethylidene (1-indenyl tetramethylcyclopentadienyl)zirconium(IV)dichloride, racemic-dimethylsilyl bis(2-methyl-4-t-butyl-1-cyclopentadienyl)zirconium(IV)dichloride, racemic-ethylene bis(1-indenyl)hafnium(IV)dichloride, racemic-ethylene bis(4,5,6,7-tetrahydro-1-indenyl)hafnium(IV) dichloride, racemic-dimethylsilyl bis(1-indenyl)hafnium (IV)dichloride, racemic-dimethylsilyl(4,5,6,7-tetrahydro-1-indenyl)hafnium(IV)dichloride, racemic-1,1,2,2-tetramethylsilanylene bis(1-indenyl)hafnium(IV)dichloride, racemic-1,1,2,2-tetramethylsilanylene bis(4,5,6,7-tetrahydro-1-indenyl)hafnium(IV), dichloride, ethylidene(1-indenyl-2,3,4,5-tetramethyl-1-cyclopentadienyl)hafnium (IV)dichloride, racemic-ethylene bis(1-indenyl)titanium (IV)dichloride, racemic-ethylene bis(4,5,6,7-tetrahydro-1-indenyl)titanium(IV)dichloride, racemic-dimethylsilyl bis (1-indenyl)titanium(IV)dichloride, racemic-dimethylsilyl bis(4,5,6,7-tetrahydro-1-indenyl)titanium(IV)dichloride, racemic-1,1,2,2-tetramethylsilanylene bis(1-indenyl) titanium(IV)dichloride racemic-1,1,2,2-tetramethylsilanylene bis(4,5,6,7-tetrahydro-1-indenyl) titanium(IV)dichloride, and ethylidene(1-indenyl-2,3,4,5-tetramethyl-1-cyclopentadienyl)titanium IV) dichloride.

Preferred metallocenes are bis(cyclopentadienyl)titanium dimethyl, bis(cyclopentadienyl)zirconium, isopropyl (cyclopentaienyl)fluroenyl)zirconium dimethyl, bis(1-indenyl)zirconium(IV)dimethyl, (4,5,6,7-tetrahydro-1-indenyl)hafnium(IV)dimethyl, dimethylzirconene, dimethyethylenebisindenylzirconium, and dimethylethylene bis(tetrahydroindenyl)zirconium.

The transition metal catalyst useful in this invention can also include non-cyclopentadienyl catalyst components (such as pentadienyls) as well as ligands such as borollides or carbollides in combination with a transition metal.

Transition metal catalyst precursor also includes traditional Ziegler-Natta ("ZN") catalysts precursor which are represented by the formula $M'^a R_a$ wherein M' is a transitional metal from the Groups 3 through 10, the lanthanide, actinide Series in the Periodic Table, wherein "a" is its valence state and the number of R's is equal to "a" and each may be the same or different and independently selected from the group consisting of halogens(preferably Cl and Br); alkyls(preferably $C_1$–$C_{20}$; more preferably ethyl, butyl, octyl and ethylhexyl); alkoxys (preferably $C_1$–$C_{20}$, more preferably ethoxy, isopropoxy, butoxy and phenoxy); aryls (preferably $C_6$–$C_{20}$, including substituted aryls, more preferably phenyl, p-tolyl, benzyl, 4-t-butylphenyl, 2,6-dimethylphenyl, 3,5-methylphenyl, 2,4-dimethylphenyl, 2,3-dimethylphenyl groups) and mixtures thereof. For example, $TiCl_4$, $TiCl_3$, $VOCl_3$, $VCl_4$, $TiPhenyl_4$, $V(OButyl)_3$, tetramethyl zirconium, tetrabenzylzirconium, tetramethoxyzirconium, tetraethoxyzirconium, tetrabutoxyzirconium, bis(2,5-di-t-butylphenoxy) dimethylzirconium, bis(2,5-di-t-butylphenoxy) dichlorozirconium and zirconium bis(acetylacetonate), tetramethyl titanium, tetrabenzyltitanium, tetramethoxytitanium, tetraethoxytitanium, tetrabutoxytitanium, bis(2,5-di-t-butylphenoxy) dimethyltitanium, bis(2,5-di-t-butylphenoxy) dichlorotitanium and titanium bis(acetylacetonate) and mixtures thereof.

Methods of Producing the Compositions of the Present Invention

Making the Support

The methods of the invention generally encompass a step where reactive functionality containing carrier particles are reacted with a halogenated organic in the presence of a base whereby at least a portion of the reactive functionality groups are removed or eliminated and the halogenated organic groups are covalently bonded to the carrier particle surface.

The base reactant used is typically a metal hydroxide (such as NaOH or KOH), primary, secondary or tertiary amines (such as methylamine, dimethylamine, triethylamine, dimethylaniline and tributylamine), metal alkyls (wherein the metal is from Group 1, 2, 13, and 14 of the Periodic Table and the alkyl are $C_1$–$C_8$, including n-Butyllithium, dibutyl magnesium, trimethylaluminum, methyllithium). Preferred bases are NaOH, n-butyllithium, dibutyl magnesium, triethyl amine and tributyl amine. Most preferred bases are NaOH, n-butyllithium, and tributylamine and mixtures thereof.

When an aqueous basic solution is used, the resultant reaction product should have excess water removed.

The methods preferably involve formation of an initial mixture containing the carrier particles, a base and the halogenated organic. The initial mixture preferably also contains a solvent (preferably non-aqueous); however, neat mixtures of the carrier particles, halogen and base may be used. The ingredients forming the initial mixture may be combined in virtually any desired sequence to effect the desired transformation.

While the carrier particles may contain some free water, it is preferred that any free water be removed before the initial mixture is formed. For example, by solvent exchange, heating, and chemical reaction.

The carrier particles are preferably porous. The porosity of the particles is preferably dictated by the intended end use of the particles. Preferably, the porosity of the particles to be deactivated is such that the resulting particles would be suitable for use as polyolefin catalyst supports.

The initial mixture preferably contains a solvent to facilitate intimate mixing of the carrier particles and the reagents.

The solvent is preferably a non-aqueous solvent. Organic solvents such as $C_5$–$C_{10}$ hydrocarbons, typically, hexane, tetrahydrofuran, toluene, ether and heptane are generally preferred. The amount of solvent used is not critical, but amounts in excess of that needed to form a pourable slurry are generally unnecessary.

The mixing temperature depends on the solvent and base used and can vary from well below 0° C. to the reflux temperature of the solvent, preferably from about 0° C. to the reflux temperature of the solvent.

In general the method of the present invention comprises the steps of combining the carrier and the base and mixing a temperature in the range of from about –78° C. to the reflux temperature of the solvent (preferably from about 0° C. to the ref lux temperature of the solvent). The mixing time depends on the mixing temperature. In general the higher the temperature the shorter the time required. Mixing should continue until the reaction between the carrier's functionality groups and the basic reagent is completed.

While reacting the support with the halogenated organic can generally be completed in a single reaction step, it is possible to repeat the reaction step by recovering the support particles and forming a new reaction mixture in the same manner as for the formation of the initial mixture.

Once the desired level of functionality has been accomplished, the support particles may be recovered from the mixture. The preferred level of the functionality is a approximately 10 mmoles per gram of support; more preferably, 0.1–5 mmole/g; and more preferably, 1–3 mmole/g. This can be determined by known analytical techniques, such as IR, NMR, and elemental analysis.

Preferably, recovery can be accomplished by simply evaporating the solvent and other reactants. In some instances, it may be desirable to wash the halogenated carrier with a solvent to further remove any residual reactants(such as the base), etc. Preferably, however, the reactants are selected such that they are all removable by volatilization. Preferably, the removal is conducted under at least a partial vacuum. If desired, techniques such as spray drying may be employed.

The carrier of the present invention will typically be in the form of a free flowing powder having the surface groups R as defined above used in the reacting step. The recovered product may be further treated as desired to place a catalyst or other constituents on its surface.

This support may be used to support a transition metal catalytic precursor or can be used in another embodiment of the present invention to prepare the supported activator.

Making the Supported Activator

The activator $[Ct]^+[M''(Q_1-Q_{n+1})]^-$ and/or $M''(Q_n)$ as defined above, is dissolved in the desired solvent described above, preferably toluene, $C_5$–$C_{10}$ hydrocarbons, and combined with the halogenated support to form a slurry. The reagents are mixed thoroughly using well known mixing and agitation techniques and can be mixed at any appropriate temperature depending on the reagents selected, preferably room temperature. This step can be performed after the halogenated support is prepared or can be accomplished simultaneously with the preparation of the halogenated support by combining all the ingredients in one step.

These materials can be combined at any temperature suitable for the reagents, typically from about –78° C. to the reflux temperature of the halogenated reagent, preferably from about 0° C. to the ref lux temperature of the solvent. This can be accomplished using multiple mixing steps. For example, the mixing can take place for one period of time at one temperature, e.g., –78° C. for two hours and then for another period of time at another temperature, e.g., reflux temperature for two hours. This stepwise (varying time and temperature) can be used for any number of mixing conditions. The time for mixing is dependent on the mixing temperature. In general, it is best to keep the temperature low so as to avoid decomposing temperature sensitive reagents. The protocol is selected so as to maximize the efficiency of the reaction.

Once the desired level of activator on the support is achieved the supported activator can be recovered by any of number of usual methods, typically by evaporating the solvent and other reactants.

Making the Supported Catalytic Systems

Transition metal (Ziegler Natta and/or metallocene) catalyst precursors can be placed on the support and/or supported activator of the present invention through various techniques. For example, once the halogenated support and/or supported activator is prepared, the catalytic precursor can be placed on the support through known techniques such as in a slurry, dry mixing or fluidized gas mixing well known to those skilled in the art. Moreover, an admixture of all necessary reagents can be prepared where the halogenated support, support activator and catalyst system are prepared simultaneously.

Furthermore, the supported activator and catalyst precursor need not be combined until introduced into the polymer reactor zone either before or during the introduction of the monomer feedstock.

Methods of Using the Compositions of the Present Invention

Activation of the supported catalyst or catalytic system of the present invention may be accomplished by any suitable method for bringing the support and/or the supported activator into contact with the transition metal catalytic precursor to create the active catalytic species. Such mixing techniques include the mixing of the dry powders, mixing through gaseous impregnation or via a slurry composition in a solvent.

It is also possible to use any of the traditional transition metal catalytic activator co-catalysts which should be selected based on the catalytic system design and desired polymer characteristics.

The activated catalyst is useful to polymerize olefinic materials, particularly ethylene. Polymerizations of olefinic monomers can be accomplished by any number of well known techniques by having the olefinic material come into contact with the polymerization catalyst(s) in a reaction zone under appropriate conditions.

As used herein, "Polymerization" includes copolymerization and terpolymeriztion and the terms olefins and olefinic monomer includes olefins, alpha-olefins, diolefins, strained cyclic, styrenic monomers, acetylenically unsaturated monomers, cyclic olefins alone or in combination with other unsaturated monomers. While the catalyst system of the present invention is active for this broad range of olefinic monomer feedstock, alpha-olefins polymerizations is preferred, especially the homopolymerization of ethylene or the copolymerization of ethylene with olefins having 3 to 10 carbon atoms.

"Polymerization techniques" for olefin polymerization according to the present invention can be solution polymerization, slurry polymerization or gas phase polymerization techniques. Method and apparatus for effecting such polymerization reactions are well known and described in, for example, Encyclopedia of Polymer Science and Engineering published by John Wiley and Sons, 1987, Volume 7, pages 480–488 and 1988, Volume 12, pages 504–541. The catalyst according to the present invention can be used in similar amounts and under similar conditions to known olefin polymerization catalyst.

Typically, for the slurry process, the temperature is from approximately 0 degrees C. to just below the temperature at which the polymer becomes swollen in the polymerization medium. For the gas phase process, the temperature is from approximately 0 degrees C. to just below the melting point of the polymer. For the solution process, the temperature is typically the temperature from which the polymer is soluble in the reaction medium up to approximately 320 degrees C.

The pressure used can be selected from a relatively wide range of suitable pressures, e.g., from subatmospheric to about 350 Mpa. Suitably, the pressure is from atmospheric to about 6.9 Mpa, or 0.05–10 MPa, especially 0.14–5.5 Mpa. Pressure is dictated by the process and the desired product. In the slurry or particle form process, the process is suitably performed with a liquid inert diluent such as a saturated aliphatic hydrocarbon. Suitably the hydrocarbon is a $C_4$ to $C_{10}$ hydrocarbon, e.g., isobutane or an aromatic hydrocarbon liquid such as benzene, toluene or xylene. The polymer is recovered directly from the gas phase process or by filtration or evaporation from the slurry process or evaporation from the solution process.

The catalysts of the present invention are particularly suited for the gas phase or slurry process.

In addition to the examples of the present invention provided in the Examples 1–17, preferred supports, supported activators, and supported catalyst systems can be prepared from the following materials.

Table of Preferred Materials

Abbreviations:

| | |
|---|---|
| TS = | Tosyl (paratoluene sulfonic acid) |
| APS = | aminopropyl silica |
| [DMAH] [BF$_{20}$] = tetrakis (pentafluorophenyl) borate | dimethylanilinium |
| BEM = | butylethylmagnesium; |
| PVC = | Poly(vinylchloride); |
| PVA = | Poly(vinylalcohol) |
| BF$_{15}$ = | tris (pentafluorophenyl) borane; |
| TEAL = | triethylaluminum; |
| TNOA = | Tri-n-octylaluminum; |
| en(ind)$_2$ = | bisindenylethane; |
| APG = | Aluminumphosphate gel; |
| CPS = | chloropropyl silica; |
| PMMA = | Poly(methylmethacrylate); |
| CMPS = | chloromethylated poly(styrene) |
| BuCp = | butylcyclopentadienyl |
| iPr = | isopropyl |

-continued

| Carrier | Base/RX | Compound A | Metal Cmpd. |
|---|---|---|---|
| Silica-200° C. | KOH/BrC$_3$F$_7$ | [DMAH] [BF$_{20}$] | en(ind)$_2$ZrMe$_2$ |
| Silica-400° C. | MeOLi/TsOC$_6$F$_5$ | [DMAH] [AlF$_{20}$] | en(ind)$_2$HfMe$_2$ |
| Silica-600° C. | Bu$_2$Mg/ClC$_6$F$_5$ | TNOA | (BuCp)$_2$ZrCl$_2$ |
| Silica-Alumina 600° C. | MeLi/BrC$_6$F$_5$ | [DMAH] [BF$_{20}$] | iPrCpFluZrMe$_2$ |
| PVC | MeLi/BrC$_6$F$_5$ | [DMAH] [BF$_{20}$] | iPrCpFluZrMe$_2$ |
| PVC | Bu$_2$Mg/ClC$_6$F$_5$ | TEAL | (BuCp)$_2$ZrCl$_2$ |
| PVA | KOH/(CF$_3$)$_2$C$_6$H$_3$ | BF$_{15}$ | Ph$_2$C(CpTMS)$_2$ZrMe$_2$ |
| Silica-Titania 600° C. | BEM/ClC$_3$F$_7$ | [DMAH] [BF$_{20}$] | (BuCp)$_2$ZrCl$_2$ |
| Silica-600° C. | MeLi/Br$_2$C$_6$F$_4$ | 1) t-BuLi 2) BF$_{15}$ | en(ind)$_2$ZrMe$_2$ |
| Silica-600° C. | LiAlH$_4$/BrC$_6$F$_5$ | [Ph$_3$C] [BF$_{20}$] | Me$_2$Si(C$_5$Me$_4$)N-t-BuZrMe$_2$ |
| PVC | MeLi/Br$_2$C$_6$F$_4$ | B((CF$_3$)$_2$C$_6$H$_3$)$_3$ | (BuCp)$_2$ZrCl$_2$ |
| Silica-800° C. | nBuLi/BrC$_6$F$_5$ | [DMAH] [BF$_{20}$] | en(ind)$_2$ZrMe$_2$ |
| Alumina | MeLi/BrC$_6$F$_5$ | [DMAH] [BF$_{20}$] | en(ind)$_2$HfMe$_2$ |
| Titania | MeMgCl/BrC$_6$F$_5$ | [DMAH] [BF$_{20}$] | (BuCp)$_2$ZrCl$_2$ |
| APG | MeLi/BrC$_6$F$_5$ | [DMAH] [BF$_{20}$] | iPrCpFluZrMe$_2$ |
| Silica-Titania-Chromia | MeLi/BrC$_6$F$_5$ | [DMAH] [BF$_{20}$] | iPrCpFluZrMe$_2$ |
| APG | MeNa/BrC$_6$F$_5$ | [DMAH] [BF$_{20}$] | (BuCp)$_2$ZrCl$_2$ |
| Silica-Alumina | MeK/BrC$_6$F$_5$ | [DMAH] [BF$_{20}$] | Ph$_2$C(CpTMS)$_2$ZrMe$_2$ |
| PVA | MeLi/BrC$_6$F$_5$ | [DMAH] [BF$_{20}$] | (BuCp)$_2$ZrCl$_2$ |
| PVC | MeLi/BrC$_6$F$_5$ | [DMAH] [BF$_{20}$] | en(ind)$_2$ZrMe$_2$ |
| CMPS | MeLi/BrC$_6$F$_5$ | [DMAH] [BF$_{20}$] | Me$_2$Si(C$_5$Me$_4$)N-t-BuZrMe$_2$ |
| Brominated PE | MeLi/BrC$_6$F$_5$ | [DMAH] [BF$_{20}$] | (BuCp)$_2$ZrCl$_2$ |
| Alumina | MeLi/Br$_2$C$_6$F$_4$ | 1) t-BuLi 2) B((CF$_3$)$_2$C$_6$H$_3$)$_3$ | (BuCp)$_2$ZrCl$_2$ |
| Silica-800° C. | Cp$_2$Mg/BrC$_6$F$_5$ | [DMAH] [BF$_{20}$] | Zr(CH$_2$Ph)$_4$ |
| Silica-800° C. | Bu$_2$Mg/ClC$_6$F$_5$ | TEAL | TiCl$_4$/(BuCp)$_2$ZrCl$_2$ |
| Silica-Titania | Bu$_2$Mg/ClC$_6$F$_5$ | TNOA | TiCl$_4$/(BuCp)$_2$ZrCl$_2$ |
| Silica-600° C. | n-BuLi/BrC$_6$F$_5$ | [DMAH] [BF$_{20}$] | Ti(CH$_2$Ph)$_4$/Cp$_2$ZrCl$_2$ |
| APG | MeOLi/TsOC$_6$F$_5$ | [DMAH] [AlF$_{20}$] | Me$_2$Si(C$_5$Me$_4$)N-t-BuZrMe$_2$ |
| Silica-Alumina | Bu$_2$Mg/ClC$_6$F$_5$ | TNOA | (BuCp)$_2$ZrCl$_2$ |
| PVA | MeLi/BrC$_6$F$_5$ | [DMAH] [BF$_{20}$] | (BuCp)$_2$ZrCl$_2$ |
| PVC | MeLi/BrC$_6$F$_5$ | [DMAH] [BF$_{20}$] | (BuCp)$_2$ZrCl$_2$ |
| CMPS | Bu$_2$Mg/ClC$_6$F$_5$ | TEAL | Zr(CH$_2$Ph)$_4$ |
| Brominated PE | KOH/(CF$_3$)$_2$C$_6$H$_3$ | BF$_{15}$ | TiCl$_4$/(BuCp)$_2$ZrCl$_2$ |
| Alumina | BEM/ClC$_3$F$_7$ | [DMAH] [BF$_{20}$] | TiCl$_4$/(BuCp)$_2$ZrCl$_2$ |
| Talc | n-BuLi/BrC$_6$F$_5$ | [DMAH] [BF$_{20}$] | Ti(CH$_2$Ph)$_4$/Cp$_2$ZrCl$_2$ |
| Montmorollinite, Clay | MeOLi/TsOC$_6$F$_5$ | [DMAH] [AlF$_{20}$] | Me$_2$Si(C$_5$Me$_4$)N-t-BuZrMe$_2$ |
| PMMA | Bu$_2$Mg/ClC$_6$F$_5$ | TNOA | (BuCp)$_2$ZrCl$_2$ |
| Talc | MeLi/BrC$_6$F$_5$ | [DMAH] [BF$_{20}$] | (BuCp)$_2$ZrCl$_2$ |
| Starch | MeLi/BrC$_6$F$_5$ | [DMAH] [BF$_{20}$] | (BuCp)$_2$ZrCl$_2$ |
| Zeolite | MeLi/BrC$_6$F$_5$ | [DMAH] [AlF$_{20}$] | Ti(CH$_2$Ph)$_4$/Cp$_2$ZrCl$_2$ |
| CPS | Bu$_2$Mg/ClC$_6$F$_5$ | TEAL | en(ind)$_2$ZrMe$_2$ |
| APS | MeLi/BrC$_6$F$_5$ | [DMAH] [AlF$_{20}$] | en(ind)$_2$HfMe$_2$ |
| Chlorinated Silica | Bu$_2$Mg/ClC$_6$F$_5$ | TNOA | iPrCpFluZrMe$_2$ |
| Fluorinated Silica | MeOLi/TsOC$_6$F$_5$ | [DMAH] [AlF$_{20}$] | Me$_2$Si(C$_5$Me$_4$)N-t-BuZrMe$_2$ |
| Silica-Magnesia | Bu$_2$Mg/ClC$_6$F$_5$ | TNOA | (BuCp)$_2$ZrCl$_2$ |
| Silica-Magnesia | MeLi/BrC$_6$F$_5$ | [DMAH] [BF$_{20}$] | (BuCp)$_2$ZrCl$_2$ |
| Silica-600° C. | Bu$_2$Mg/ClC$_6$F$_5$ | TNOA | TiCl$_4$ |
| Silica-600° C. | KOH/Cl$_3$CCO$_2$C$_2$Cl$_7$ | Al$_2$Et$_3$Cl$_3$ | VOCl$_3$ |
| Silica-600° C. | Bu$_2$Mg/ClC$_6$F$_5$ | TNOA | VOCl$_3$/TiCl$_4$ |
| Silica-600° C. | MeLi/BrC$_6$F$_5$ | BF$_{15}$/TEAL | VOCl$_3$/Zr(CH$_2$Ph)$_4$ |

The invention is further illustrated by the following examples. It is understood that the invention is not limited to the specific details of the examples.

EXAMPLES 1–14

Examples 1–10 are example of modifying a carrier containing reactive functionalities to create the support of the present invention. Examples 11 and 12 are examples of preparing the supported activator according to the present invention. Examples 14 are examples of the supported activator catalyst system according to the present invention.

Abbreviations:

Si—Al=Silica Alumina
Si—$MgCl_2$=Silica Supported Magnesium Chloride
Si—Al—Ti=Silica Alumina Titania Cogel
CMPS=Chloromethylated Poly(styrene)
H-PS=Poly(4-hydroxystyrene)
PVA=Poly(vinylalcohol)
BPFB=Bromopentafluorobenzene
4-BTFT=4-Bromotetrafluorotoluene
B-3,5-DTFMB=Bromo-3,5-di(trifluoromethyl)benzene
1,4-DBTFB=1,4-Dibromotetrafluorobenzene
TFMI=Trifluoromethyliodide

EXAMPLES 1–14

| EX. | CARRIER | BASE | SOLVENT | HALO. ORG. | COMMENTS |
|---|---|---|---|---|---|
| 1 | Silica | NaOH | $H_2O$ | BPFB | 100 g of silica is slurried with 0.3 moles of NaOH in 1L of water for 4 hours. The support is filtered, washed and dried. 20 g of the support is slurried in 150 mL of hexanes and cooled to −78° C. under an atmosphere of argon. 80 mmols of BPFB is added as a hexane solution. The slurry is mixed for 1 hour at −78° C. and warmed to room temperature (mixed 4h). The support is filtered and dried *in vacuo*. |
| 2 | Alumina | $Bu_3N$ | Hexanes | 4-BTFT | 100 g of alumina is slurried with 0.4 moles of $Bu_3N$ in 1L of hexanes for 4 hours. The support is filtered, washed and dried under an atmosphere of argon. 20 g of the support is slurried in 150 mL of hexanes and cooled to −78° C. under an atmosphere of argon. 80 mmols of 4-BTFT is added as a hexane solution. The slurry is mixed for 1 hour at −78° C. and warmed to room temperature (mixed 4h). The support is filtered and dried *in vacuo*. |
| 3 | CMPS | n-BuLi | Hexanes | BPFB | 20 g of CMPS is slurried with enough n-BuLi in 100 mL of hexanes at 0° C. and warmed to RT for 4 hours to react with all pendant chlorines. The reacted support is cooled to −78° C. under an atmosphere of argon. BPFB is added as a hexane solution to react with the produced anionic sites. The slurry is mixed for 1 hour at −78° C. and warmed to room temperature (mixed 4h). The support is filtered and dried *in vacuo*. |
| 4 | Silica | n-BuLi | Hexanes | B-3,5-DTFMB | 100 g of silica is slurried with 0.3 moles of n-BuLi in 1L of hexanes at 0° C. for 1 hour and RT for 2 hours. The support is filtered, washed and dried. 20 g of the support is slurried in 150 mL of hexanes and cooled to −78° C. under an atmosphere of argon. 80 mmols of B-3,5-DTFMB is added as a hexane solution. The slurry is mixed for 1 hour at −78° C. and warmed to room temperature (mixed 4h). The support is filtered, washed, and dried *in vacuo*. |
| 5 | Silica | KOH | $H_2O$ | 1,4-DBTFB | 100 g of silica is slurried with 0.3 moles of KOH in 1L of water for 4 hours. The support is filtered, washed and dried. 20 g of the support is slurried in 150 mL of hexanes and cooled to −78° C. under an atmosphere of argon. 80 mmols of 1,4-DBTFB is added as a hexane solution. The slurry is mixed for 1 hour at −78° C. and warmed to room temperature (mixed 4h). The support is filtered, washed and dried *in vacuo*. |
| 6 | Si—Al | MeLi | Ether | BPFB | 100 g of silica-alumina is slurried with 0.3 moles of MeLi in 1L of diethyl ether at 0° C. for 2 hours and at RT for 4 hours. The support is filtered, washed and dried. 20 g of the support is slurried in 150 mL of hexanes and cooled to −78° C. under an atmosphere of argon. 80 mmols of BPFB is added as a hexane solution. The slurry is mixed for 1 hour at −78° C. and warmed to room temperature (mixed 4h). The support is washed, filtered and dried *in vacuo*. |

-continued

EXAMPLES 1–14

| | | | | | |
|---|---|---|---|---|---|
| 7 | Si—MgCl$_2$ | Bu$_2$Mg | Heptanes | BPFB | 100 g of silica supported magnesium chloride is slurried in 1L of heptanes and cooled to 0° C.. 200 mmol of DBM is added as a heptane solution and mixed for 1 hour. The slurry is warmed to RT for 4 hours. The support is filtered, washed and dried *in vacuo*. 20 g of this support is slurried 200 mL of hexanes under an argon atmosphere and cooled to −78° C. 80 mmol of BPFB is added as a hexane solution and the reaction media is mixed for 1 hour. After warming to RT the slurry is stirred an additional 4 hours prior to filtering, washing and drying *in vacuo*. |
| 8 | Si—Al—Ti | Bu$_2$Mg | Toluene | BPFB | 100 g of silica-alumina-titania cogel is slurried in 1L of toluene and cooled to 0° C. 200 mmol of DBM is added as a toluene solution and mixed for 1 hour. The slurry is warmed to RT for 4 hours. The support is filtered, washed and dried *in vacuo*. 20 g of this support is slurried 200 mL of hexanes under an argon atmosphere and cooled to −78 ° C. 80 mmol of BPFB is added as a hexane solution and the reaction media is mixed for 1 hour. After warming to RT the slurry is stirred an additional 4 hours prior to filtering, washing and drying *in vacuo*. |
| 9 | H—PS | Bu$_2$Mg | Toluene | BPFB | 100 g of poly(hydroxystyrene) is swollen in 1L of toluene and cooled to 0° C. DBM is added as a toluene solution to deprotonate the polymer and mixed for 1 hour. The slurry is warmed to RT for 4 hours. The support is filtered, washed and dried *in vacuo*. 20 g of this support is slurried 200 mL of toluene under an argon atmosphere and cooled to −78° C. BPFB is added as a toluene solution to react with the formed phenoxide anions and the reaction media is mixed for 1 hour. After warming to RT the slurry is stirred an additional 4 hours prior to filtering, washing and drying *in vacuo*. |
| 10 | PVA | NaAc | H$_2$O | TFMI | 100 g of poly(vinylalcohol) is dissolved in 1L of water and cooled to 0° C. Sodium acetate is added as an aqueous solution and mixed for 1 hour. The slurry is warmed to RT for 4 hours. The support is filtered, washed and dried *in vacuo*. 20 g of this support is slurried 200 mL of pentane under an argon atmosphere and cooled to −78° C. TFMI is added as a pentane solution and the reaction media is mixed for 1 hour. After warming to RT the slurry is stirred an additional 4 hours prior to filtering, washing and drying *in vacuo*. |

| EX. | Carrier | Activator | COMMENTS |
|---|---|---|---|
| 11 | Ex. 5 | BF$_{15}$ | The support is slurried in hexane and cooled to −78° C. under an atmosphere of dry, deoxygenated argon. t-Butyllithium is added to debrominate the supported organic moiety. The slurry is warmed to room temperature and a solution of BF$_{15}$ is added. The slurry is mixed a further 2 hours and the solid is filtered, washed and dried *in vacuo*. |
| 12 | Ex. 1 | [DMAH][BF$_{20}$] | The support is slurried in hexanes and [DMAH][BF$_{20}$] is added as a solution. After one hour of mixing the solvents are removed *in vacuo*. |
| 13 | Ex. 3 | [DMAH][BF$_{20}$] | The support is swollen in toluene and [DMAH][BF$_{20}$] is added as a solution. After one hour of mixing the solvents are removed *in vacuo*. |
| 14 | Ex. 8 | [DMAH][BF$_{20}$] Cp$_2$ZrMe$_2$ | The support is slurred in hexanes and a mixture of [DMAH][BF$_{20}$] and Cp$_2$ZrMe$_2$ is added as a solution at 0° C. After one hour of mixing the solvents are removed *in vacuo*. |

Polymerization Example

EXAMPLE 15

The Support

SiO$_2$, available from Grace Davison, a business unit of W. R. Grace Co.-Conn., as Sylopol® 948 (30 g, previously calcined at 800° C. for 4 hours), was slurried in 150 mL of hexanes under an atmosphere of purified argon and cooled to 0° C. A hexane solution of n-BuLi (80 mmol) was added and mixed for 2 hours at 0° C. After warming to RT, the slurry was mixed an additional 16 hours. The slurry was recooled to 0° C. and neat bromopentafluorobenzene (100 mmol) was added. After mixing 1 hour at 0° C., the slurry was warmed to RT and mixed a further 16 hours. The liquid phase was removed and the solids washed with hexanes (3 times with 75 mL). The solid was dried in vacuo.

EXAMPLE 16

The Supported Activator

To Example A (2.4 g) was added toluene (50 mL) under an atmosphere of dry, deoxygenated argon. A toluene solution of [DMAH][BF$_{20}$] (50 mL, 1 mmol) was added to the foregoing slurry. The light green slurry was mixed for 1 hour. The liquid phase was removed and the solids washed with hexanes (3 times with 50 mL). The solid was dried in vacuo.

EXAMPLE 17

The Support Catalyst System

A 500 mL polymerization vessel was charged, in order, with heptanes (150 mL), TEAL (1 mmol), Example B (100 mg) and zirconocene dichloride (40 mmol) under an atmosphere of dry, deoxygenated argon at 40° C. The reactor was refilled with ethylene to a pressure of 45 psig after evacuation. Polymerization was carried out for 30 minutes and was quenched by rapid venting of monomer followed by methanol (50 mL). The polymer was washed with methanol and dried more than 12 hours in a vacuum oven at 60° C. to yield 15 g of polyethylene.

What is claimed is:

1. A supported composition being prepared by a process comprising
    a) reacting a Carrier having a reactive functional group LH with a halogenated organic compound $RX_{(n)}X'$ in the presence of a base to form a halogenated support represented by the formula Carrier—L—$RX_{(n)}$ b) contacting the halogenated support with a Compound A to form a halogenated support composition; and
    c) optionally, recovering the halogenated support composition;
        wherein the Carrier, which has a surface, is porous, covalently bonded through L to R and comprises at least one member selected from the group consisting of talc, clay, SiO$_2$, Al$_2$O$_3$, MgO, MgCl$_2$, ZrO$_2$, TiO$_2$, Fe$_2$O$_3$, B$_2$O$_3$, CaO, ZnO, BaO, ThO$_2$, aluminum phosphate gel, polyvinylchloride, hydroxy substituted polystyrene, and an organo magnesium compound represented by the formula $MgR^2{}_aX^2{}_b$, wherein $R^2$ is an alkyl group having 1 to 20 carbon atoms, an alkoxy group having 1 to 20 carbon atoms or an aryl group having 6 to 20 carbon atoms, $X^2$ is a halogen, a is a number from 0 to 2 and b is a number from 0 to 2 wherein a+b=2;
        L is selected from the group consisting of oxygen, boron-containing groups, carbon containing groups, sulfur, nitrogen containing groups, and mixtures thereof and is obtained by the reaction of a reactive functional group on the Carrier with a base reactant selected from the group consisting of a metal hydroxide, an organo amine, and a metal alkyl wherein the metal is selected from the group consisting of metals of Groups 1, 2, 13 and 14 of the Periodic Table, and mixtures thereof;
        R is selected from the group consisting of alkyl, aryl and alkenyl; and
        $X_{(n)}$ and X' are each a halogen;
        n is a number from 1 to 9;
    Compound A comprises at least one compound selected from the group consisting of $[Ct]^+[M^n(Q)_y]^-$     I and $M^n(Q_n)$,     II wherein
        $[Ct]^+$ is a cation capable of activating a transition metal catalyst precursor by formation of a cation therefrom through the mechanisms of either protonation or abstraction;
        M is boron, phosphorus, antimony, aluminum or mixtures thereof;
        n is a number representing the valence state of M; and
        the groups Q are the same or different and are independently selected from the group consisting of halogen, halogenated organic, hydride radical, bridged and unbridged dialkylamido radicals, alkoxide and aryloxide radicals, substituted hydrocarbyl radicals, halocarbyl and substituted-halocarbyl radicals, hydrocarbyl and halocarbyl-substituted organometalloid radicals, and mixtures thereof, the number of Q groups bound to M being depicted by y which varies from 1 to n+1.

2. The supported composition according to claim 1, wherein
    $[Ct]^+$ is selected from the group consisting of ammonium cations of methylamine, aniline, dimethylamine, diethylamine, N-methylaniline, diphenylamine, trimethylamine, triethylamine, N,N-dimethylaniline, methyldiphenylamine, pyridine, p-bromo-N,N-dimethylaniline, and p-nitro-N-N-dimethylaniline; phosphonium cations of triethylphosphine, triphenylphosphine and . diphenylphosphine, oxonium cations of ethers; sulfonium cations of thioethers; silver cations; carbocations; tropylium; ferrocenium; and mixtures thereof; and
    Q is at least one member selected from the group consisting of fluorine, chlorine, bromine, halogenated mono aryl, multi-cyclic aryl, alkyl, and alkenyl.

3. The supported composition of claim 1
    wherein Compound A is selected from the group consisting of N,N-dimethylaniline tetrakis (pentafluorophenyl) borate and tris (pentafluorophenyl) borane.

4. The supported composition of claim 1 wherein Compound A is represented by the formula $[Ct]^+[M^n(Q)_y]^-$ wherein $[M^n(Q)_y]^-$ is selected from the group consisting of $B(Ph)_4^-$, $B(C_4F_5)_4^-$, $B(C_6H_2(CF_3)_3)_4^-$, $B(C_6H_4)_4^-$, $Al(Ph)_4^-$, $Al(C_6H_2(CF_6H_2(CF_3)_3)_4^-$, $PF_6^-$, $BF_4^-$, $B(OPh)_4^-$, $Al(C_6H_5)_4^-$ and mixtures thereof.

5. The supported composition according to claim 4 wherein R is C$_1$–C$_{20}$ alkyl, C$_6$–C$_{20}$ aryl, or a mixture thereof.

6. The supported composition according to claim 3 wherein R is selected from the group consisting of halogenated phenyl; halogenated phenyl substituted with methyl, ethyl, n-propyl, iso-propyl, n-butyl, n-octyl, or 2-ethylhexyl; halogenated p-tolyl; halogenated benzyl; halogenated 4-t-butylphenyl; halogenated 2,6-dimethylphenyl; halogenated 3,5-dimethylphenyl; halogenated 2,4-dimethylphenyl; halogenated 2,3-dimethylphenyl; and mixtures thereof.

7. The supported composition according to any one of claims 1 to 6 wherein R is selected from the group consisting of p-fluorophenyl, 3,5-difluorophenyl, pentafluorophenyl, 3,4,5-trifluorophenyl, 3,5-bis(trifluoromethyl)phenyl, and mixtures thereof.

8. The supported composition according to claim 1 wherein the process of preparing the composition further comprises dissolving the Compound A in an organic solvent prior to bringing Compound A into contact with the halogenated support.

9. The supported composition according to claim 8 wherein the organic solvent is a $C_5$–$C_{10}$ hydrocarbon.

10. The supported composition according to claim 1 wherein steps a)–b) of the process of preparing the composition are performed simultaneously.

11. A process for preparing a supported composition comprising a) reacting a Carrier having a reactive functional group LH with a halogenated organic compound, $RX_{(n)}X'$ in the presence of a base to form a halogenated support represented by the formula $$\text{Carrier-L---RX}_{(n)}$$

b) contacting the halogenated support with a Compound A to obtain a halogenated supported composition; and c) optionally, recovering the halogenated support composition;

wherein the Carrier, which has a surface, is porous, covalently bonded through L to R and comprises at least one member selected from the group consisting of talc, clay, $SiO_2$, $Al_2O_3$, MgO, $MgCl_2$, $ZrO_2$, $TiO_2$, $Fe_2O_3$, $B_2O_3$, CaO, ZnO, BaO, $ThO_2$, aluminum phosphate gel, polyvinylchloride, hydroxy substituted polystyrene, and an organo magnesium compound represented by the formula $MgR^2{}_aX^2{}_b$, wherein $R^2$ is an alkyl group having 1 to 20 carbon atoms, an alkoxy group having 1 to 20 carbon atoms or an aryl group having 6 to 20 carbon atoms, $X^2$ is a halogen, a is a number from 0 to 2 and b is a number from 0 to 2 wherein a+b=2;

L is selected from the group consisting of oxygen, boron-containing groups, carbon-containing groups, sulfur, nitrogen-containing groups, and mixtures thereof and is obtained by the reaction of a reactive functional group on the Carrier with a base reactant selected from the group consisting of a metal hydroxide, an organo amine, and a metal alkyl wherein the metal is selected from the group consisting of metals of Groups 1, 2, 13 and 14 of the Periodic Table, and mixtures thereof;

R is selected from the group consisting of alkyl, alkenyl, and aryl; and $X_{(n)}$ and X' are each halogen; and n is a number from 1 to 9;

Compound A comprises at least one compound selected from the group consisting of $$[Ct]^+[M''(Q)_y]^- \qquad \text{I}$$

and $$M''(Q_n), \qquad \text{II}$$

wherein

[Ct]$^+$ is a cation capable of activating a transition metal catalyst precursor by formation of a cation therefrom through the mechanisms of either protonation or abstraction;

M is boron, phosphorus, antimony, aluminum or mixtures thereof;

n is a number representing the valence state of M; and the groups Q are the same or different and are independently selected from the group consisting of halogen, halogenated organic, hydride radical, bridged and unbridged dialkylamido radicals, alkoxide and aryloxide radicals, substituted hydrocarbyl radicals, halocarbyl and substituted-halocarbyl radicals, hydrocarbyl and halocarbyl-substituted organometalloid radicals, and mixtures thereof, the number of Q groups bound to M being depicted by y which varies from 1 to n+1.

12. The process according to claim 11 wherein the process further comprises dissolving the Compound A in organic solvent prior to bringing Compound A into contact with the halogenated support.

13. The process according to claim 12 wherein the organic solvent is a $C_5$–$C_{10}$ hydrocarbon.

14. The process according to claim 11 wherein steps a)–b) are performed simultaneously.

* * * * *